April 2, 1963 C. J. WHEELER 3,083,582
COMPOSITE BELT DRIVE
Filed Jan. 17, 1961

INVENTOR.
CHARLES J. WHEELER
BY
Watts, Edgerton, Pyle, & Fisher
ATTORNEY

United States Patent Office 3,083,582

Patented Apr. 2, 1963

3,083,582

COMPOSITE BELT DRIVE

Charles J. Wheeler, Kingston, Okla., assignor, by direct and mesne assignments, of one-half to a partnership composed of Thomas E. Fisher and Lowell L. Heinke; three-eighths to Pyle and Fisher, a partnership composed of Ray S. Pyle and Thomas E. Fisher, and one-eighth to Lowell L. Heinke Filed Jan. 17, 1961, Ser. No. 83,206
20 Claims. (Cl. 74—229)

This invention relates to belts and belt drives, and more particularly to an improved power transmission belt and pulley-sprocket.

Modern endless power transmission members are either chains or flexible energy-transmission belts of one of two basic types. There are so-called V belts. A V belt relies upon friction between the belt and a pulley for the transmission of energy. Second, there are toothed belts which rely primarily on a grooved sprocket in driving engagement with the teeth of the belt for the transmission of energy.

Each of the types of belt has definite limitations. The V belt tends to slip under high torque or great resistance, thus resulting in a substantial energy loss in many cases. Also, this slippage tends to wear the belt quickly. In the absence of slippage, V belts have high energy loss because of the friction which must be built into a V belt system to prevent slippage. With toothed belts there is a tendency for the teeth to be sheared from the remainder of the belt.

The chains which are also used as endless power transmission members are not only expensive but also noisy. Chains are also notorious for their tendency to "jump a tooth" of the drive sprocket.

This invention provides an endless transmission belt which has the desired characteristics of both the V and toothed types of belts, the positiveness of a chain, and few or none of the listed and other undesirable characteristics of prior chains and belts. These advantages are obtained by providing an endless pliable belt with a convoluted spring-like member partially embedded in it. A portion of each convolution projects from one face of the belt to engage with the teeth of a sprocket and provide positive non-slip drive.

Accordingly, a principal object of this invention is to provide a novel and improved pliable belt structure and a convoluted member for engaging sprocket teeth for a positive drive.

Another object of this invention is to provide a composite belt structure which includes a pliable and flexible band for frictional driving and resilient convolutions projecting from the band for engagement with sprocket teeth.

A further object of this invention is to provide a drive mechanism which includes a pulley having teeth and friction surfaces and a belt looped over the pulley with the belt having a flexible friction driving band and resilient tooth-engaging coils embedded in the band.

A more particular object of this invention is to provide a belt having a fabric reinforced rubber band and a spirally convoluted steel coil partially embedded therein for use in an energy-transmission system.

Another more particular object of this invention is to provide a belt which can be formed so that it is engageable by opposed pulleys directly opposite each other and in engagement with opposite faces of the belt.

Another more general object of this invention is to provide a silent resilient composite belt having combined friction and positive interlock drive.

An additional object of the invention is to provide a novel and improved sprocket for use with a power transmission belt made in accordance with one or more of the preceding objects.

Other objects and a fuller understanding of the invention may be had by referring to the following description and claims taken in conjunction with the accompanying drawings in which:

Figure 1:
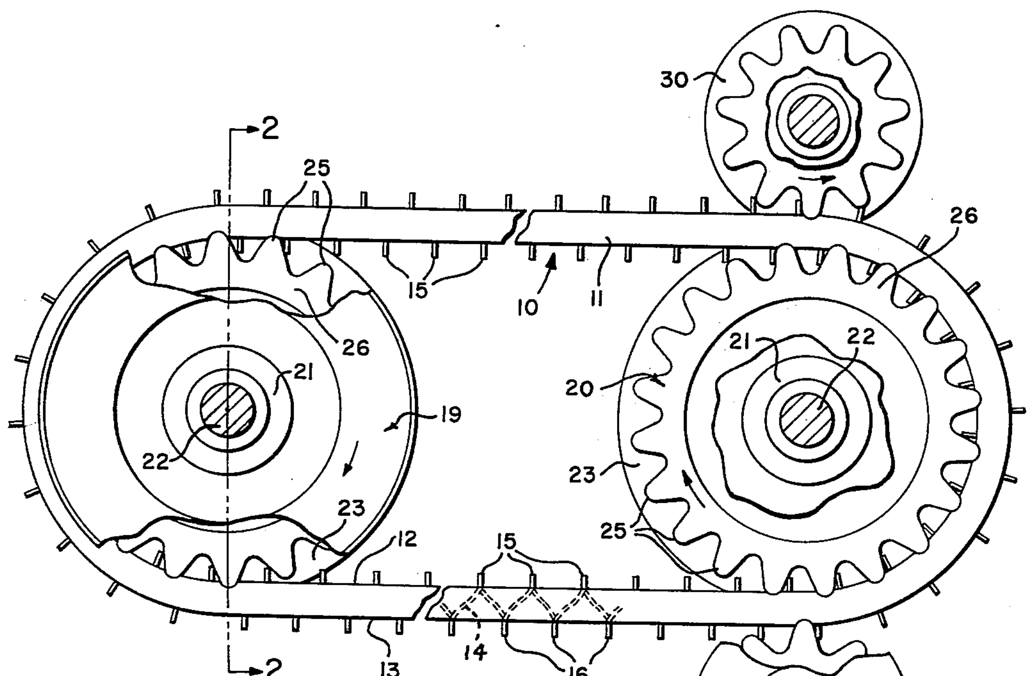
FIGURE 1 is a side elevational view, with parts broken away and removed of a pair of pulleys and the improved composite belt looped thereover and a pair of pulleys driven by engagement with the peripheral surface of the belt and portions projecting outwardly.
Figure 2:
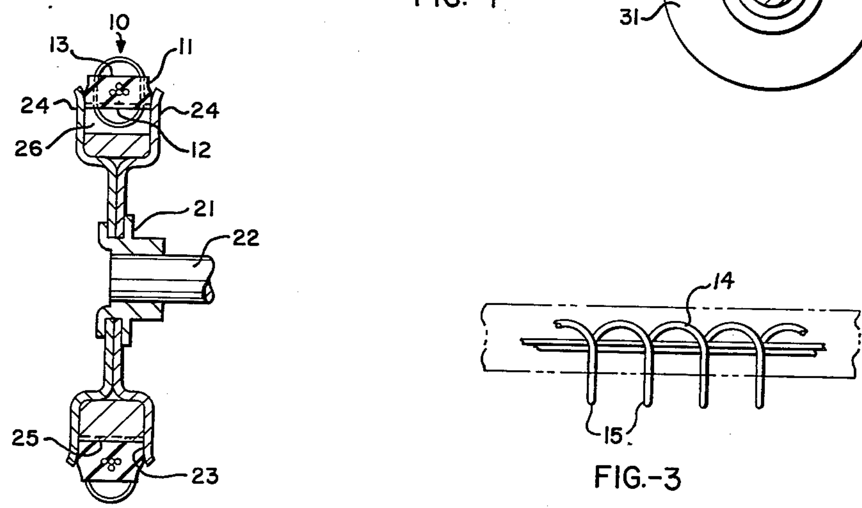
FIGURE 2 is a sectional view as seen from the plane indicated by the line 2—2 of FIGURE 1; and, FIGURE 3 is a fragmentary sectional view of another form of the belt showing the projecting coils extending from only one side of the belt.

Referring now to the drawings, and particularly FIGURES 1 and 2, a novel and improved composite belt 10 is provided. The belt 10 includes an endless, flexible band 11 preferably made of rubber reinforced with fiber cord or another similar type of material well known in the art. The band 11 has an inner rim 12 and an outer rim 13. A convoluted member which may be a stretched coil spring 14 is partially embedded in the band 11 such that a plurality of portions of convolutions 15 partially project inwardly from the inner rim 12, FIGURE 1. The inner convolution portions 15 are regularly spaced circumferentially. Similarly, other portions 16 project outwardly from the outer rim 13. Before the band 11 is cured the inner and outer convolution portions 15, 16 are preferably bent such that each lies in a plane normal to the adjacent part of the rim and the axis of the belt.

The belt 10 is an energy transmission device and is used as part of the energy transmission system. Normally, the system will include at least two pulley-sprockets designated generally as 19, 20. Conventionally, one pulley-sprocket 19 drives the belt 10 and another pulley-sprocket is driven by the belt 10.

In FIGURES 1 and 2 the pulley-sprocket 19 is shown in section. This pulley will be described in detail, it being recognized that the pulley 20 may be identical. Each pulley-sprocket has a central hub 21 surrounding a shaft 22. Each pulley-sprocket has an annular belt receiving groove 23, the transverse limits of which are defined by a pair of side flanges 24. The pulley-sprocket also includes a central filler or spacer 26 interposed between and abutting the flanges 24. The spacer includes a plurality of circumferentially spaced rounded teeth 25 which define the inner extremity of the groove 23.

It will be apparent from the preceding description that a simplified toothed pulley-sprocket or sheave is obtained. Three stampings, the spacer 26 and the identical flanges 24 are telescoped over the hub 21 and fixed together. Thus, a toothed sheave is obtained without the use of a hobbing or other tooth-forming machine tool.

The belt 10 is looped over the pulley-sprockets 19, 20 such that the teeth 25 drivingly engage the partially-projecting convolutions 15 of the spring 14. The rounded teeth 25 also partially embed themselves in the pliable band 11 (FIGURE 1) to provide a friction engagement between the pulley-sprocket and belt. For additional frictional engagement, the sides of the belt may be in frictional contact with the flanges 24. The flanges 24 also serve the function of a guide to maintain the belt on the pulley-sprocket.

As the pulley-sprockets 19, 20 and belt 10 are thus engaged, a composite action is obtained. There is an interlocking driving relationship between the teeth 25 and the inner convolution portions 15 which is similar to the driving engagement of a toothed belt and sprocket. There is also a frictional driving engagement between the belt 10 and the pulley-sprocket 20 similar to that of a conventional flexible belt and pulley. The advantages of a flexible belt are obtained in that the mechanism is silent running and can inherently sustain a high-shock load applied without breaking. The advantages of a chain are obtained in that there is a positive interlock driving action and non-slippage under high-torque loads. There is little chance of breaking the belt since the coil is resilient and the band is flexible.

Figure 3:
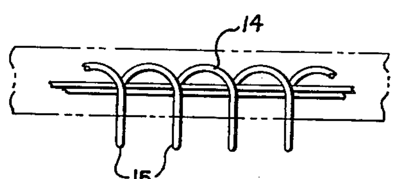

FIGURE 3 shows a modification of the coil spring embedded in the flexible band 11 wherein only the projecting inner convolution portions 15 of the coil are provided. Again, the portions each lie in a plane normal to the axis of the band 11. With such a construction, line contact instead of point contact between the teeth, and the convolutions is obtained to gain full advantage of the positive interlock drive.

Referring again to FIGURE 1, another of the advantages of the device is shown there. This advantage resides in the outer convolution portions 16. With such a construction all of the versatility of a chain is obtained such as sprockets may be on either side of the belt and the belt may take any number of non-elliptical shapes. At the same time, the silence of a V belt is obtained.

With chains it is necessary to stagger pulleys on opposite sides of the driving sprockets or pulley. With the V belts and toothed types of belts it has been necessary to position all sprockets on the inside of the belt. With a construction according to FIGURE 1 it is possible for the first time to provide opposed pulley-sprockets whose centers of rotation are in a common plane normal to the path of travel of the belt. This is demonstrated by pulleys 30, 31 which are external of the belt 10 and driven by it. They are positioned with the axes of the pulleys 20, 30, 31 disposed in a common plane and simultaneously driven by the belt 10.

Although the invention has been described with a great deal of particularly, it is believed that it essentially comprises an energy-transmission belt having a flexible band and a convoluted resilient member partially embedded in the band with a plurality of convolutions partially projecting from the band.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A composite power transmission belt comprising an endless flexible band including an inner rim, a convoluted resilient member partially embedded in said band, said resilient member having a plurality of its convolutions forming loops projecting inwardly from said band inner rim, said loops each being spaced from the inner rim.

2. A composite power transmission belt comprising an endless flexible band including an inner rim, a spirally convoluted coil partially embedded in said band, said coil having a plurality of its convolutions forming loops projecting inwardly from said band inner rim, said loops each being spaced from the inner rim.

3. A composite power transmission belt comprising, an endless band of rubber material including an inner rim, a spirally convoluted coil partially embedded in said band, said coil having a plurality of its convolutions forming loops projecting inwardly from said band inner rim, said loops each being spaced from the inner rim.

4. In combination, a plurality of pulley-sprockets and a composite power transmission belt reeved over at least some of the pulley-sprockets, each pulley-sprocket having a plurality of circumferentially spaced teeth, said belt including an endless flexible band and a convoluted resilient member partially embedded in said band, a portion of a plurality of convolutions of said resilient member partially projecting from said band, some of the projecting portions of said convolutions being in driving engagement with some of said pulley-sprocket teeth.

5. In the combination of claim 4, said resilient band including an inner rim, and some of said teeth of said pulley-sprockets being in compressing engagement with said inner rim as well as in engagement with some of said projecting portions of convolutions.

6. A power transmission system comprising in combination, a plurality of pulley-sprockets, each of said pulley-sprockets including a hub, an annular sheave disposed around said hub, said sheave having a pair of lateral flanges defining an annular groove around the outer periphery thereof, a plurality of circumferentially spaced teeth carried by said sheave and disposed within said groove, a composite power transmission belt reeved over said pulleys, said power transmission belt including endless flexible band having an inner rim and an outer rim, a convoluted resilient member partially embedded in said band, a plurality of the convolutions of said resilient member partially projecting from the outer rim of said band, two of said pulley-sprockets being arranged in an opposed position wherein the rotation centers of said pulley-sprockets lie on a plane normal to said belt, one of said two pulley members being in driving engagement with the inner rim of said band and the other of said two pulley-sprockets being in driving engagement with the outer rim of said band.

7. A power transmission device comprising, an endless flexible belt having an inner rim and reinforcing fibers embedded therein providing endless reinforcement, a convoluted member including a plurality of convolutions, each convolution having a portion partially embedded in the belt and at least one other portion projecting from the belt, at least some of said other projecting portions projecting inwardly from the inner rim, said portions projecting inwardly from said inner rim being uniformly spaced circumferentially to provide teeth for driving engagement with a toothed pulley or the like.

8. The device of claim 7 wherein the belt includes an outer rim and at least some of said other projecting portions project outwardly from the outer rim and wherein the portions projecting outwardly are uniformly spaced circumferentially to provide teeth for driving engagement with a pulley-sprocket or the like.

9. A power transmission device comprising, an endless flexible belt having an outer rim and reinforcing fibers embedded therein providing endless reinforcement, a convoluted member including a plurality of convolutions, each convolution having a portion partially embedded in the belt and at least one other portion projecting from the belt, at least some of said other projecting portions projecting outwardly from the outer rim, said portions projecting outwardly from said outer rim being uniformly spaced circumferentially to provide teeth for driving engagement with a toothed pulled or the like.

10. A composite power transmisison belt comprising an endless flexible band having an inner and an outer rim, and a spirally convoluted coil embedded in said band and having loops projecting from each such rim, each such loop being spaced from its rim.

11. The device of claim 10 wherein the portions projecting inwardly from said inner rim are uniformly spaced circumferentially, and wherein the portions projecting outwardly from the outer rim are uniformly spaced circumferentially.

12. The device of claim 10 wherein the endless flexible band is a fiber reinforced rubber material and wherein the convoluted coil is metal.

13. A power transmission system comprising in combination, a plurality of pulley-sprockets, each of said pulley-sprockets including an annular sheave having a pair of lateral flanges defining an annular groove around the outer periphery thereof, each sheave including a plurality of circumferentially spaced teeth disposed within said groove, a composite power transmission belt reeved over said pulleys, said power transmisison belt including endless flexible band having an inner rim and an outer rim, a convoluted resilient member partially embedded in said band, a plurality of portions of the convolutions of said resilient member partially projecting from the outer rim of said band, at least one of said pulley-sprockets being arranged in driving engagement with the portions projecting from the outer rim and two of said pulley members being in driving engagement with the inner rim of said band.

14. A power tranmission system comprising in combination, a plurality of pulley-sprockets, each of said pulley-sprockets including, an annular sheave having a pair of lateral flanges defining an annular groove around the outer periphery thereon, each sheave including a plurality of circumferentially spaced teeth disposed within said groove, a composite power transmission belt reeved over said pulleys, said power transmission belt including an endless flexible band having an inner rim and an outer rim, a convoluted resilient member partially embedded in said band, a plurality of portions of the convolutions of said resilient member partially projecting from the outer rim of said band and other portions of the convolutions projecting inwardly from the inner band, at least two of said two pulley members being in driving engagement with the portion projecting from the inner rim of said band and another of said pulley-sprockets being in driving engagement with the portions projecting from the outer rim of said band.

15. The combination of claim 4 wherein said projecting portions are uniformly spaced.

16. The device of claim 4 wherein said belt has inner and outer rims and where some of the projecting portions extend inwardly from the inner rim and others extend outwardly from the outer rim.

17. The device of claim 15 wherein the inwardly extending portions are uniformly spaced and the outwardly extending portions are uniformly spaced.

18. A composite power transmission belt comprising, an endless flexible band having an inner rim and an outer rim, a convoluted resilient member partially embedded in said band, said resilient member having a plurality of portions of its convolutions partially projecting from said band, each of said projecting portions being generally of U-shaped configuration and projecting from and spaced from one of said rims.

19. The device of claim 18 wherein said one rim is said inner rim.

20. The device of claim 18 wherein said portions project from both of said rims.

References Cited in the file of this patent

UNITED STATES PATENTS

| | | |
|---|---|---|
| 252,028 | Gear | Jan. 10, 1882 |
| 254,089 | Briggs | Feb. 21, 1882 |
| 2,199,529 | Shackelford | May 7, 1940 |
| 2,610,357 | Hawkinson | Sept. 16, 1952 |
| 2,838,946 | Kiekhaefer | June 17, 1958 |
| 2,923,166 | Brindley et al. | Feb. 2, 1960 |

FOREIGN PATENTS

| | | |
|---|---|---|
| 289,043 | Great Britain | Sept. 6, 1928 |
| 517,269 | Belgium | July 29, 1953 |